(12) United States Patent
Duffy

(10) Patent No.: US 6,619,723 B2
(45) Date of Patent: Sep. 16, 2003

(54) BED PANEL WITH TORSION PIN HINGE

(75) Inventor: Michael John Duffy, Midland (CA)

(73) Assignee: M & C Corporation, Warren, MI (US)

( * ) Notice: Subject to any disclaimer, the term of this patent is extended or adjusted under 35 U.S.C. 154(b) by 0 days.

(21) Appl. No.: 10/256,948

(22) Filed: Sep. 27, 2002

(65) Prior Publication Data

US 2003/0025352 A1 Feb. 6, 2003

(51) Int. Cl.$^7$ .................................................. B60J 5/00
(52) U.S. Cl. ............................ 296/146.11; 296/190.11; 296/37.6; 16/369; 16/390; 16/308; 16/298; 16/290; 410/135
(58) Field of Search .......................... 296/37.6, 37.14, 296/37.16, 56, 57.1, 146.11, 146.12, 190.11, 24.1; 16/369, 390, 308, 298, 290; 410/121, 129, 135, 140, 95

(56) References Cited

U.S. PATENT DOCUMENTS

| | | | |
|---|---|---|---|
| 251,591 A | * | 12/1881 | Jaeger |
| 434,212 A | * | 8/1890 | Taxis |
| 2,395,456 A | * | 2/1946 | Bunker |
| 2,733,476 A | * | 2/1956 | Eck |
| 2,799,891 A | * | 7/1957 | Ragsdale |
| 2,810,153 A | * | 10/1957 | Semar |
| 2,984,517 A | * | 5/1961 | Farrow et al. |
| 3,031,225 A | * | 4/1962 | Saffer et al. |
| 3,085,286 A | * | 4/1963 | Whitehouse et al. |
| 3,122,775 A | * | 3/1964 | Pulleyblank |
| 3,166,783 A | * | 1/1965 | Mackie et al. |
| 3,336,070 A | | 8/1967 | Jackson |
| 3,370,317 A | | 2/1968 | Marchione |
| 3,402,508 A | | 9/1968 | Kessler |
| 3,643,378 A | | 2/1972 | Velavicius et al. |
| 3,649,067 A | | 3/1972 | Louton, Jr. |
| 3,695,678 A | | 10/1972 | Gergoe |
| 3,699,716 A | | 10/1972 | Wanlass |
| 3,931,994 A | * | 1/1976 | Palmiter |
| 4,143,904 A | | 3/1979 | Cooper et al. |
| 4,285,098 A | * | 8/1981 | Hicks et al. |
| 4,291,501 A | | 9/1981 | Steinberg et al. |
| 4,378,658 A | | 4/1983 | DeLorean |
| 4,701,977 A | | 10/1987 | Hori et al. |
| 4,815,164 A | * | 3/1989 | Rottinghaus |
| 4,932,101 A | * | 6/1990 | Lualdi |
| 5,039,154 A | | 8/1991 | Lewis |
| 5,358,301 A | | 10/1994 | Konchan et al. |
| 5,427,486 A | * | 6/1995 | Green |
| D370,453 S | | 6/1996 | Shortman et al. |
| 5,533,234 A | | 7/1996 | Bizek |
| 5,641,262 A | | 6/1997 | Dunlop et al. |
| 5,787,549 A | | 8/1998 | Soderlund |
| 5,791,017 A | * | 8/1998 | Kluting |
| 5,794,309 A | * | 8/1998 | Lotz |
| 5,839,782 A | | 11/1998 | Kashiwamura et al. |
| 5,988,724 A | | 11/1999 | Wolda |
| 6,015,178 A | * | 1/2000 | Haack |
| 6,030,018 A | | 2/2000 | Clare et al. |

* cited by examiner

Primary Examiner—D. Glenn Dayoan
Assistant Examiner—Lori L Coletta
(74) Attorney, Agent, or Firm—Brooks & Kushman P.C.

(57) ABSTRACT

A method and apparatus for coupling a vehicle body panel partition for pivotal movement between an upright and a retracted position. A mounting includes hinge sets formed from two hinge leafs, a hinge leaf being used to retain one of the ends of the torsion rod pin extending through aligned pivot portions on each hinge set. Preferably, each hinge set is integrally formed with the torsion pin by retainers holding ends of the torsion pin with respect to one leaf of each of the hinge sets. In the preferred embodiment, a return bent end of a common torsion pin is received in a first leaf of one of at least two hinge sets, while the other end of the rod is bent and retained in a second leaf of a second hinge set.

17 Claims, 4 Drawing Sheets

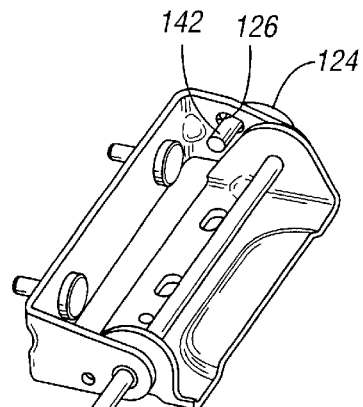
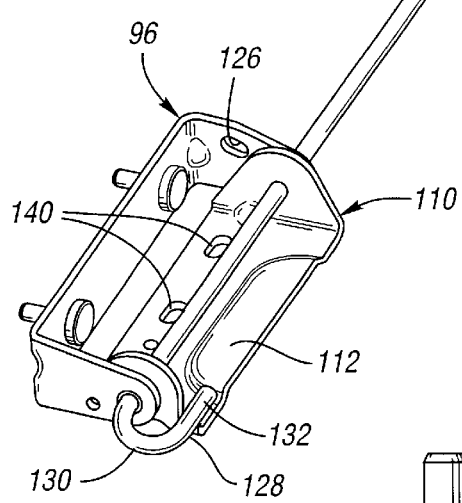
Fig. 6
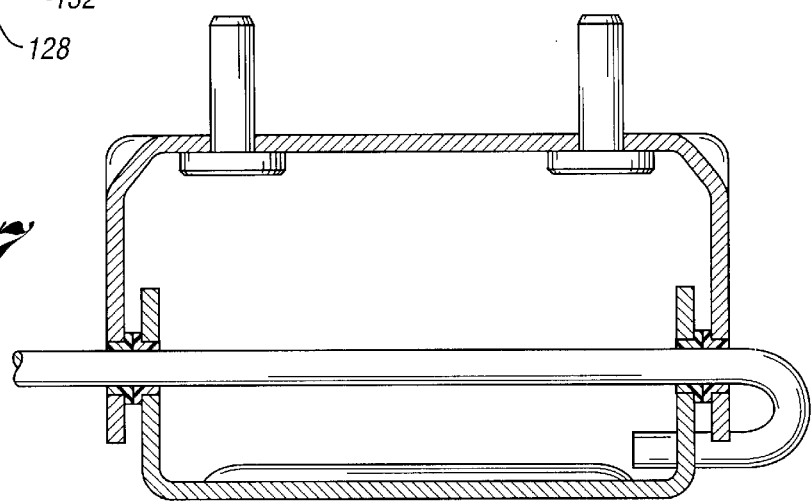
Fig. 7

BED PANEL WITH TORSION PIN HINGE

BACKGROUND OF THE INVENTION

1. Field of the Invention

The present invention relates to a vehicle compartment partition and the hinge assembly associated with the partition that includes a torsion rod as the hinge pin journaled within the hinge leafs as well as a method for assembling the hinge.

2. Background Art

The construction of a movable vehicle partitioning panel, for example, a panel at the rear of the passenger compartment of a pickup truck style body type, raises challenges for vehicle manufacturers. The interior as well as the exterior surfaces must be compatible with the adjacent interior compartment and exterior compartments of the vehicle. In addition, the mounting mechanism may be concealed for aesthetic purposes, but the panel must be stable in upright and lowered positions. As a result, any attempt to make the panel displaceable, for example, a pivot axis mounting, preferably one that includes lift assist, must be compactly packaged without affecting the aesthetic appearance or the functionality of the panel. For example, previously known mechanisms for displacing or removing vehicle body partitions, such as pickup truck style tailgates, may occupy substantial spaces in the adjacent rear body panels of the vehicle, and such space is not available near the front of the bed where other body panel features such as door supports, glass supports, hinge supports and lock supports must be aesthetically and functionally retained at the same location.

One example of a previously known tailgate mounting unit that permits pivoting of the tailgate uses a torque rod and first and second hinge sets at spaced apart positions. However, while long torque rods extending through spaced hinge sets improve available torque and cycle life of the hinge, such extended length or rod constructions lack self containment of the hinge and require adjacent support structures. As a result, the hinge structures are not so easily assembled with numerous parts coupled about the torque rod.

Another known tailgate hinge design that employs lift assistance in the form of coiled or clock spring type torsion devices are expensive to construct and generate such problems such as cycle noise and poor cycle life, due to binding between the numerous coils of the torsion spring structure in the panel mounting assembly. Moreover, previously known self-contained hinges with torque rods and spring designs do not provide a sufficient length of wire in which torsion energy can be generated to displace opposite ends of the torsion rod and thus the leaf members of the hinge set, when the hinge parts are mounted to large or massive structures.

SUMMARY OF THE INVENTION

The present invention overcomes the above mentioned disadvantages by providing a vehicle partitioning or compartment enclosing panel with a mounting assembly including a hinge with a plurality of hinge sets and a torsion rod self-contained in the hinge sets. Preferably, each hinge set receives a common torsion pin to maximize spring length in a limited cross car width that limits the onboard distance between the hinge sets. In addition, use of two separated hinge sets ease installation of the hinge, but more hinge sets can be added if additional support or pivot strength is desired.

The present invention also provides a method for forming common torsion pin hinge with a plurality of hinge sets in which the torsion pin has an elongated leg that extends through aligned first and second bores in the first and second leaf parts, respectively, bending an end of the pin to a return bent position, and retracting the return bent portion into engagement with the leaf structure. The other end of the torsion pin is retained by engagement with the other leaf part. Preferably, the engagement is performed by a retainer formed as a return bent portion of a hinge leaf plate. The bent portion of the plate can be clamped against an end, preferably a bent end, of the torsion pin to minimize assembly structures and techniques during production.

In another embodiment, the panel may be biased by the hinge for torsional force assistance when the panel is displaced from a retracted, e.g. laid down, position to an upright, e.g. vertical, position. In such a case, both ends of the torque rod may be return bent since the leg at an end of the rod leaf may be resiliently restrained against the fixed, e.g. floor mounted, leaf of one hinge set.

As a result, the present invention provides a vehicle compartment partition or end wall for a vehicle body having a floor panel to be partitioned or confined. A frame structure for the partition includes a mount for a hinge leaf, and the hinge leaf contains a portion with a bore adapted to be aligned to a bore in a second pivot portion on a second leaf adapted to be mounted to the floor panel. A torsion rod having an elongated leg extending through the aligned first and second pivot portions, includes ends that are retained with respect to one and the other of the leafs, respectively, to form an integral structure. The leafs of each hinge set are then readily mounted to the frame structure of the partition panel and the floor panel, respectively. Preferably, the ends of the torsion rod are bent to define an included angle of neutral torsion less than and intermediate to the upright and retracted positions of the panel.

BRIEF DESCRIPTION OF THE DRAWINGS

The present invention will be more clearly understood by reference to the following detailed description of the preferred embodiment when read in conjunction with the accompanying drawing in which like reference characters refer to like parts throughout the views and in which:

FIG. 6 is an enlarged perspective view similar to FIG. 5 but showing the assembly in another pivot position; and FIG. 7 is a sectional view taken along line 7—7 in FIG. 5.

DETAILED DESCRIPTION OF THE PREFERRED EMBODIMENT(S)

Figure 1:
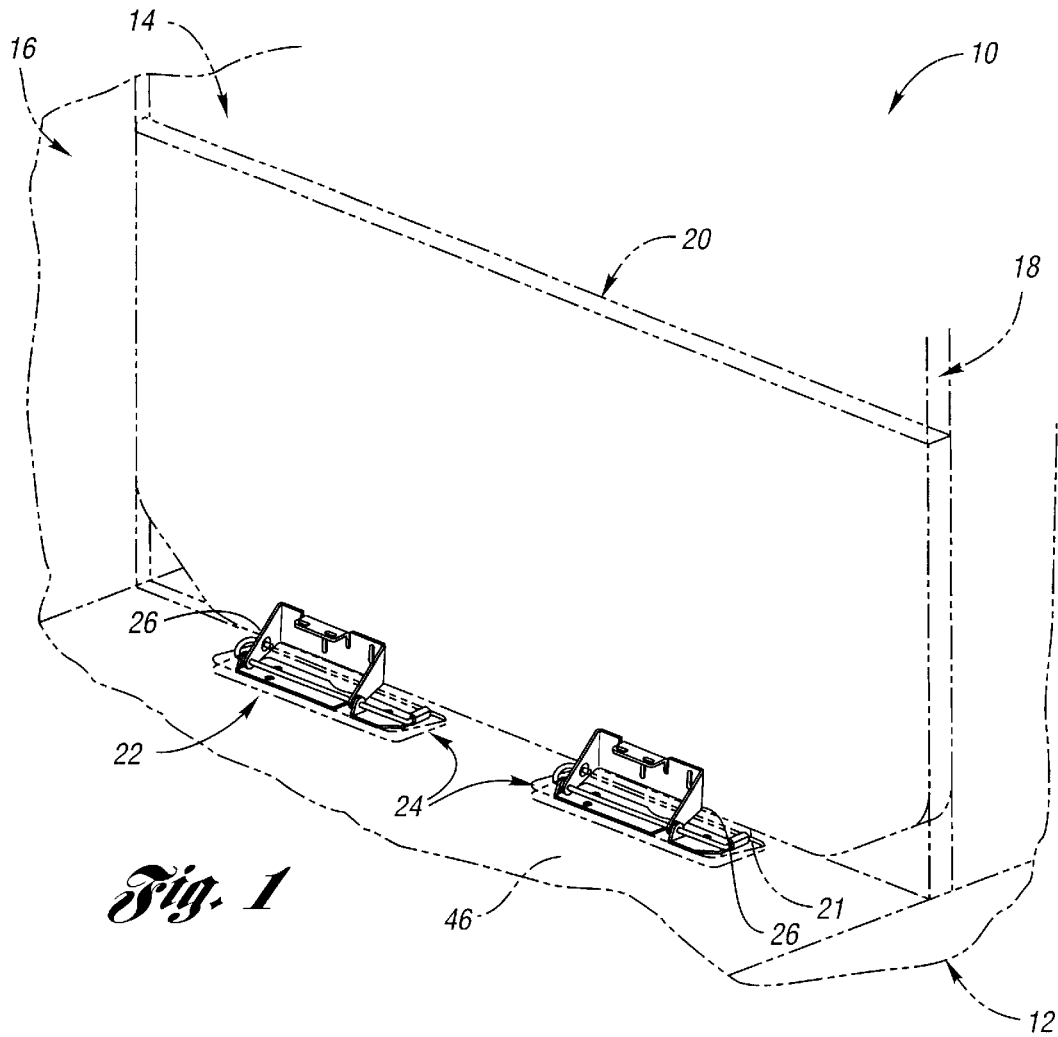
FIG. 1 is a perspective view of a motor vehicle compartment having a partition mounted in accordance with the present invention.

Referring first to FIG. 1, a motor vehicle 10 is shown comprising a body 12 defining an interior compartment 14 and a rear compartment 16 separated by bulkhead 18. The bulkhead 18 may be made of one or more structural panels, and in the preferred embodiment, includes a partition 20 carried by a mounting 22 that supports the panel 20 for pivoting displacement from an upright or latched position to a horizontal or retracted position as will be described in greater detail hereinafter. Nevertheless, it should be understood that the partition 20 and mount 22 may be employed for selective separation of other vehicle compartments in a body 12 without departing from the scope and spirit of the present invention.

Figure 2:
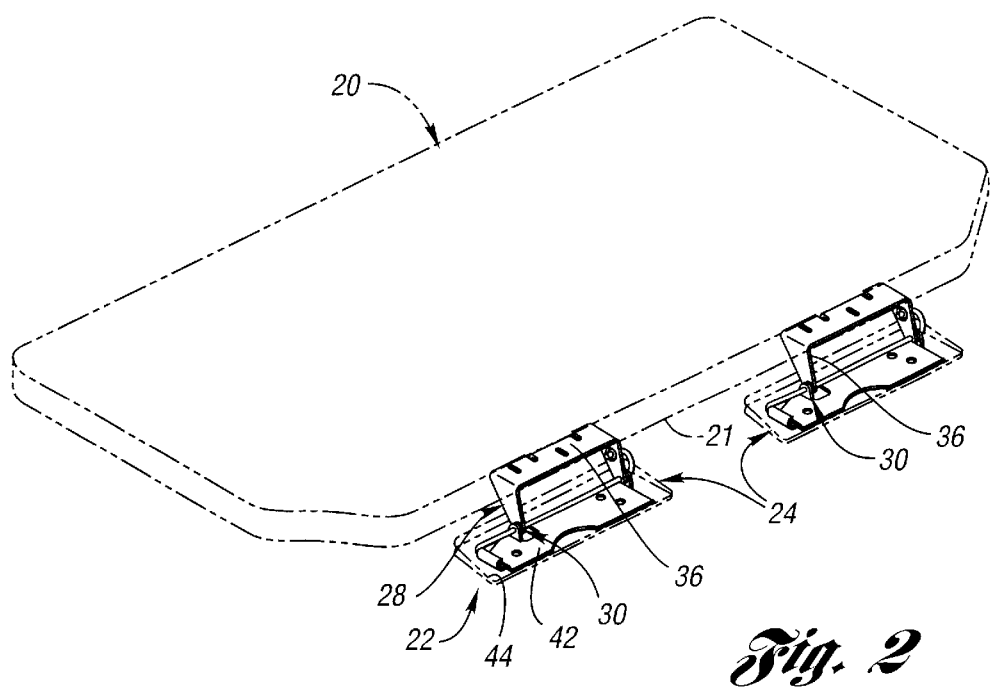
FIG. 2 is a perspective view from a different direction and exhibiting a partition of FIG. 1 in a different operating position.
Figure 3:
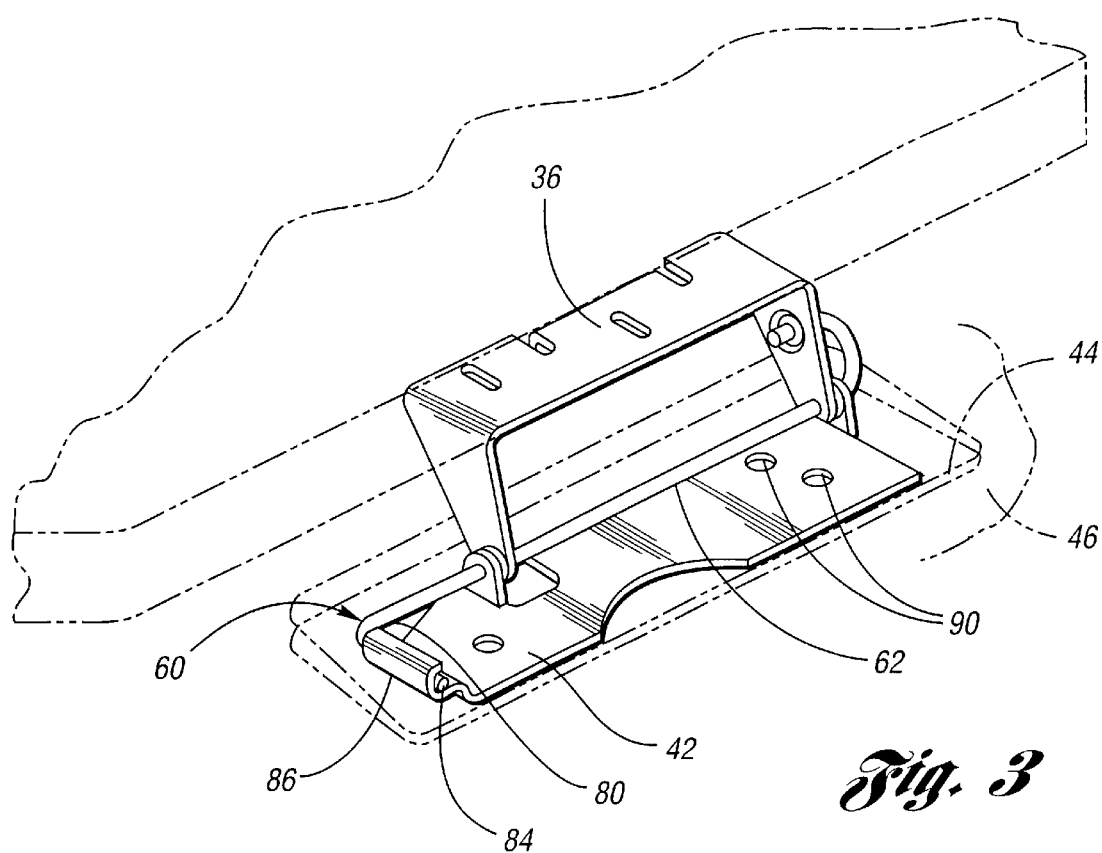
FIG. 3 is an enlarged perspective view of a hinge set shown in FIGS. 1 and 2.
Figure 4:
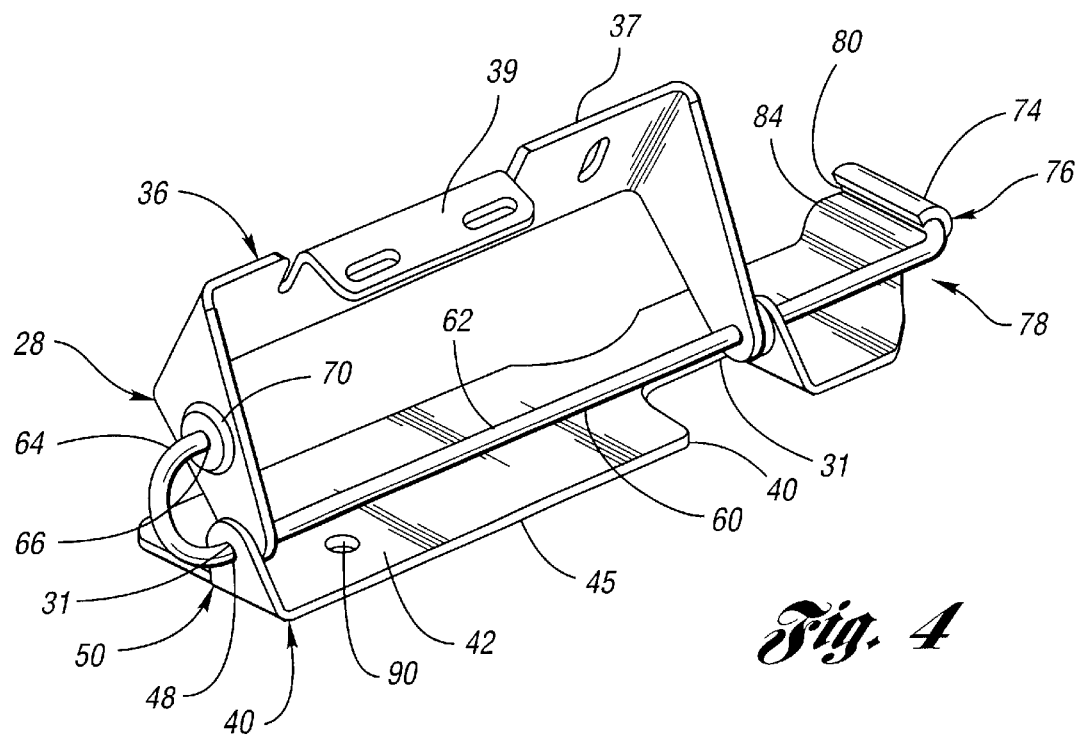
FIG. 4 is an enlarged perspective view similar to FIG. 3 but reversed.

In the preferred embodiment as shown in FIGS. 1–3, the mounting 22 comprises a pair of hinge sets 24. Each hinge set 24 includes a first hinge leaf 26 including a mount portion 36 dimensioned to mate with a frame structure 21 of the partition 20. As shown in FIG. 4, the mount portion 36 may include multiple attachment points, for example, the orthogonally aligned attachment flanges 37 and 39. An extended support portion 28 on the first leaf 26 carries a pivot portion 30 with a bore 31 dimensioned to receive a pivot pin as will be described in greater detail below. Preferably, the pivot portion 30 is carried by an extended support portion 28 at a spaced position from the mount portion 36 preferably formed as a bent flange portion of a plate forming the first hinge leaf 26. Similarly, a second leaf 40 includes a mount portion 42 dimensioned for mating with a portion 44 of the floor panel 46. An extended support portion 48, also provided by a pair of flanges bent from the plate 45, carries a second pivot portion 50 also adapted to receive a pivot pin as described in greater detail below.

In the preferred embodiment, the pivot portion 30 of the first leaf 26 includes a bore 31 that is aligned with a bore 33 in the pivot portion 50 of the second leaf 40 to receive an elongated hinge pin. Preferably, the hinge pin is a one piece torsion rod dimensioned to be received in the aligned bores of pivot portions 30 and 50 respectively. Of course, modifications of the hinge pin are possible, such as a hollow hinge pin sleeves that receives a torsion rod. However, unlike previously known torsion pin hinges, the torsion rod is retained with respect to the hinge leafs to provide an integral structure for ease of assembly. Preferably, each hinge set includes a torsion rod 60 whose ends are retained with respect to alternate ones of the leaf parts to provide spring biasing between the leaf parts depending upon the positions of the leafs as will be discussed in greater detail below. Preferably, each pivot portion 30 is formed by a flange bent from the plate of the bracket forming each leaf. Preferably, the bore 31 may be formed as an aperture in the flange that carries a bushing with an expanded collar to guide displacement of one leaf part with respect to the other leaf part.

In the preferred embodiment, the torsion rod 60 includes an elongated leg 62 inserted and received through the aligned pivot portions 30 and 50. Once the leg 62 has been extended through the aligned pivot portions 30 and 50, the first inserted end 64 of the torsion rod 60 is return bent, so that the end 64 may be engaged with respect to the support portion 28 of the hinge leaf. Preferably, the return bent portion is a simple bend, for example, an arc in a single radius, although multiple radiuses and bends may be provided without departing from the scope and spirit of the present invention. In the preferred embodiment, engagement of the end 64 comprises retraction of the first end 64 into an opening 66 in the support portion 28. Preferably, the opening 66 is embossed or otherwise reinforced as shown in FIG. 3 at 70 so that the first end 64 is locked to the support portion 28 as the leaf 26 is pivoted with respect to the second leaf 40.

A second end 80 is then retained with respect to the other leaf 40 of the hinge set. In the preferred embodiment, the second end 80 is bent outwardly from the axis of the elongated leg 62 and engaged with respect to the mount portion 42 of the second leaf. In the preferred embodiment, the retainer 78 for the end 80 includes a return bent portion 76 of the plate forming the second leaf 40 and its mount 42. The plate includes a raised shoulder 84 that supports the end 80 at the height of the aligned pivot portions 30 and 50 above the mount portion 42 of the second leaf 40 and a rolled flange 74 forms a retainer 86 entrapping the leg 82 at end 80 to retain the end 80 in a tight socket with respect to the second leaf 40. Preferably, each leaf pair 26 and 40 includes an integral torsion rod hinge pin, although a common torsion rod could be used in two or more aligned hinged sets 24. Nevertheless, the use of separate torsion rods 60 at each hinge set 24 reduces off axis moments that might otherwise effect alignment of the partition panel 20 within the bulkhead 18.

Preferably, each hinge set 24 may be wholly constructed before attachment to the partition 20 and before assembly of a partition 20 to the vehicle body 12. In the preferred embodiment, attachment openings 90 are formed in the mount portion 36 and in the mount portion 42 of the first and second leafs, respectively, adapted to receive fasteners such as rivets, bolts, welds or the like that can be used to retain the mount portions 36 and 42 with respect to the partition and the vehicle floor, respectively. In the preferred embodiment, the partition frame 21 may include threaded apertures that receive threaded fasteners extending through the openings 90 in the mount portion 36. Similarly, weld nuts or the like may be mounted in the vehicle floor panel 46 for threadably receiving bolts that extend through the openings 90 in the mount portion 42 of the second leaf 40.

Preferably, the direction at which the first end 64 extends radially outwardly from the axis of the elongated leg 62 is angled with respect to the direction at which the leg 82 of end 80 extends from the elongated leg 62 of the rod 60 when the ends are in the retained position. The angle between the ends 64 and 80 in a plane orthogonal to the leg 62 generates a neutral position, preferably at an angle preferably intermediate the latched and retracted positions of the partition 20. Preferably, the torsion rod provides a neutral spring bias at position about 30° from the upright position of the partition 20 so th partition 20 away from the upright position at which it is latched to the bulkhead 18 when the partition is unlatched. Of course, a common latch mechanism may be employed to lock the partition 20 in its upright position, its retracted position, or both, to resist the spring tension that tends to move the panel toward the neutral position. A greater angle of displacement preferably occurs between the neutral position of the spring and the retracted position of the partition 20. Accordingly, a greater spring force is generated in the torsion pin 60 to raise the partition 20 from its retracted position along the floor panel 46.

Figure 5:
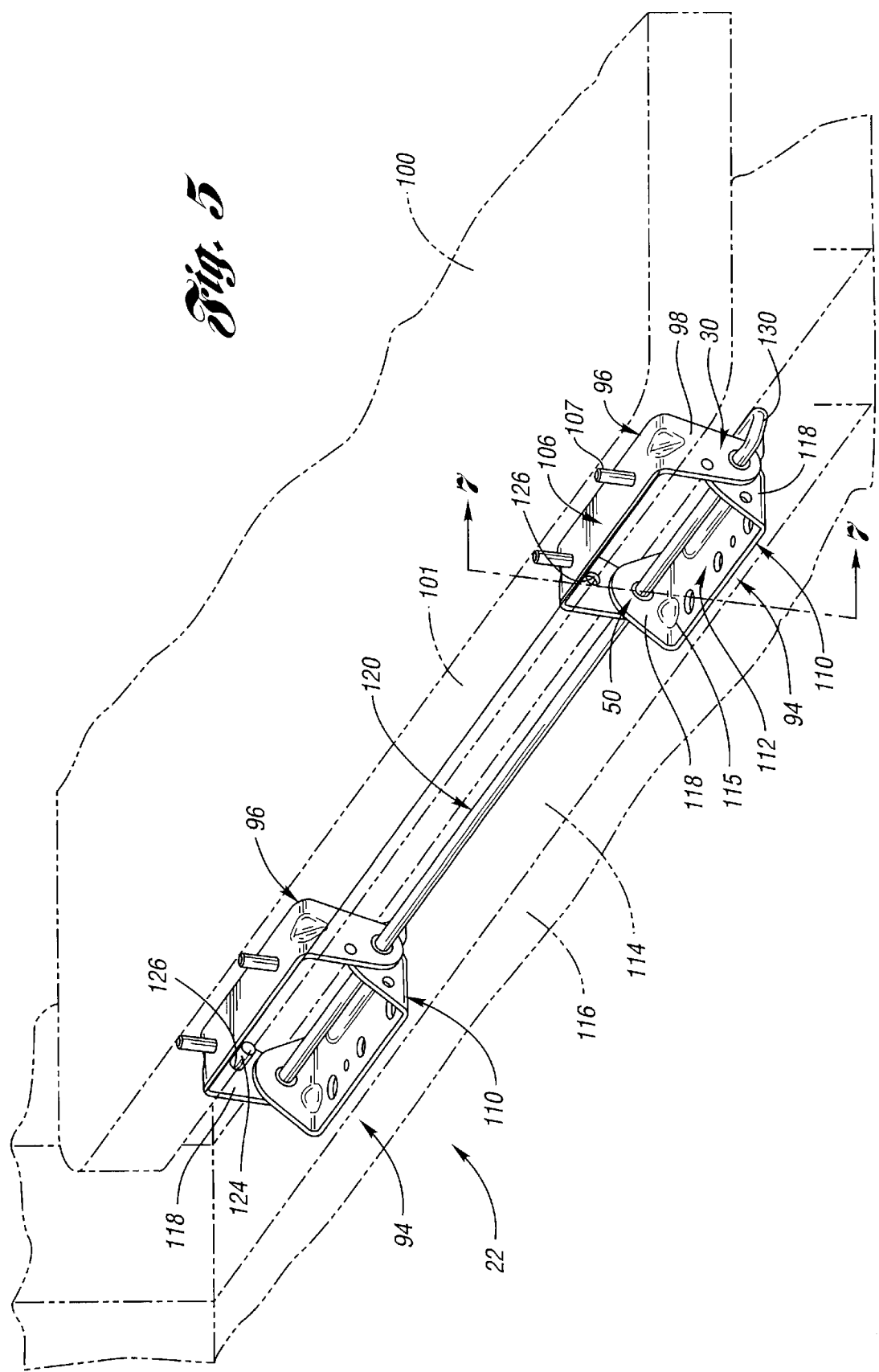
FIG. 5 is an enlarged perspective view of a modified hinge structure according to the present invention.

In the embodiment shown in FIGS. 5 and 6, the mounting 22 comprises a pair of hinge sets 94. Each hinge set 94 includes a first hinge leaf 96 including a mount portion 106 dimensioned to mate with a structure 101, such as a tailgate panel flange, of a tailgate 100. As shown in FIGS. 5 and 6, the mount portion 106 may include multiple attachment points, for example the enlarged-headed anchor studs 107, receivable in apertures in structure 101 and retained in position by lock nuts. An extended support portion 98 on the first leaf 96 carriers a pivot portion 30. As with the previous embodiment, pivot portion 30 may be formed by an aperture, preferably a bore dimensioned to receive a pivot pin, or more preferably for wear resistance, a bore dimensioned to receive a bushing that will receive a torque rod therethrough. Preferably, the pivot portion 30 is carried by an extended support portion 98 at a spaced position from the mount portion 106. Preferably, the support portion 98 is formed as a bent flange portion of a plate forming the first hinge leaf 26. Similarly, a second leaf 110 includes a mount portion 112 dimensioned for mating with a portion 114 of the floor panel 116. An extended support portion 118, also preferably provided by a pair of flanges bent from a plate 115, carries the second pivot portion 50 adapted to receive a pivot pin through aligned apertures in the support portions 118. As with the other leaf, the aperture may be preferably formed as a bore dimensioned to receive a pivot rod, or more preferably for wear resistance, an opening receiving a bushing with an internal bore dimensioned to receive the rod.

In the preferred embodiment, the pivot portion 30 of the first leaf 106 includes an aperture that is aligned with an aperture in the pivot portion 50 of the second leaf 110. Preferably, the hinge pin is a one-piece torsion rod 120 dimensioned to be received in the aligned apertures of pivot portions 30 and 50 in both left hand and right hand hinge sets 94. Preferably, the torsion rod 120 includes a elongated leg 122 inserted in and received through the aligned pivot portions 30 and 50. Once the leg 122 has been extended through the aligned pivot portions 30 and 50 of both left and right hinge sets 94, the first inserted end 124 of the torsion rod 120 is return bent so that the end 124 may be engaged with respect to the support portion 118 of the hinge leaf 94.

Preferably, the return bent portion is a simple bend for example, an arch in a single radius, although multiple radiuses and bends may be provided without departing from the scope and spirit of the present invention. In the preferred embodiment, engagement of the end 124 comprises retraction of the first end 124 into aperture 126 in the support portion 118. Preferably, the slot 126 is elongated for tolerance in assembly due to variations in the bend formation during production. The aperture 126 may be embossed or otherwise reinforced, but in the preferred embodiment is simply formed in a thick flange 118. The first end 124 of the rod 120 is locked to the support portion 118 as the leaf 96 is pivoted with respect to the second leaf 110.

A second end 130 of the torque rod 120 is then retained with respect to the second leaf 110 of the other hinge set 94. In the preferred embodiment, the second end 130 is return bent with respect to the axis of the elongated leg 122 and engaged with respect to the mount portion 112 of the second leaf 110 as shown in the left side of FIG. 6. In the preferred embodiment, the retainer 128 for the end 130 includes a recessed portion of the support flange 98 that enables a terminal leg portion 132 of the rod 120 to rest upon the mount portion 112 of the second leaf 110. Accordingly, the plane common to the return bent end 124 and the elongated leg 122, and the plane common to the end 132 and the elongated leg 122, are aligned at an angle that defines the upright position of the tailgate 100 relative to support structure, such as the vehicle floor, when the leafs are shown in the position illustrated in FIG. 5. Likewise, the spring torsion builds up when the tailgate 100 is moved to the position where the first leafs 96 are pivoted to the position illustrated in FIG. 6, where a spring tension will assist in raising the tailgate 100 from the retracted position shown in FIG. 6 to the latched or upright position illustrated in FIG. 5. Of course, the tailgate 100 may be latched in both positions to avoid unintended pivoting of the panel while the vehicle is moving.

Preferably, each hinge set 94 may be wholly constructed before attachment to the tailgate 100 and before assembly of a tailgate 100 to the vehicle body 12. In the preferred embodiment, attachment openings 140 are formed in the mount portion 112 of the first and second leafs 94, respectively. The openings may be adapted to receive fasteners such as rivets, bolts, welds or the like that can be used to retain the mount portions 106 and 112 with respect to the tailgate 100 in the vehicle floor 116, respectively. In the preferred embodiment, a tailgate structure 101 may include threaded apertures that receive threaded fasteners extending through the openings 140 in the mount portion 106. Similarly, weld nuts or the like may be mounted in the vehicle floor panel 116 for threadably receiving bolts that extend through the openings 140 in the mount portion 112 of the second leaf 110.

As shown in FIG. 7, bushings 144 and 146 are preferably carried in the apertures forming pivot portions 30 and 50. The bushings are installed back to back in the respective planes 98 and 118 so that the enlarged heads mate and contribute to alignment of the pivot portions 30 and 50 along the axis of the rod 120.

This embodiment provides a cost savings in that a straight torque rod with a return bend on each end is less expensive and less problematic to manufacture than previously known coil or clock spring arrangements. Moreover, the return bends may be wide enough to avoid the increased stress that may be provided when torsion rods' end legs are bent orthogonal to the elongated leg of the torsion rod, and which stress may need to be relieved in a separate production phase before assembly of the hinge parts. Moreover, the entire hinge and spring system is self-contained and it does not require additional installation of a resilient power source once the panel has been hingedly mounted to the support area of the vehicle body 12. Moreover, the single torque rod version avoids having separately functioning springs and pivot pins at each of the separated hinge sets and avoids multiple assembly processes associated with such parts. Moreover, this hinge arrangement produces substantially less cycle noise than other arrangements and most of the length of the rod is under torsion so that lift assist performance can be more readily adjusted by selection of the rod dimensions, and the spring resilience made powerful enough despite any narrow hinge set to hinge set distance which may be limited by the vehicle construction.

Having thus described the present invention, any modifications will become apparent to those skilled in the art to which it pertains without departing from the scope and spirit of the present invention as defined in the appended claims.

What is claimed is:

1. A vehicle compartment partition for a vehicle body having a floor panel comprising:

a panel structure including a mount for at least one hinge leaf of each of at least two hinge sets;

each hinge set having at least one first hinge leaf including a mount portion dimensioned to mate with said panel structure mount, an extended support portion, and a first pivot portion carried by said extended support portion at a spaced position from said mount portion;

at least one second hinge leaf including a mount portion dimensioned for mating with a portion of the floor panel, an extended support portion, and a second pivot portion carried by said extended support portion for alignment with said first pivot portion; and a common torsion rod having an elongated leg extending through aligned first and second pivot portions of each hinge set, said torsion rod having a first end retained against rotation with respect to one of said first and second hinge leafs in a first hinge set, and a second rod end having a return bent portion extending from an aligned longitudinal portion and retained with respect to a support portion of the other of said first and second hinge leafs in a second hinge set.

2. The vehicle compartment partition as described in claim 1 wherein said second rod end is retained by said other leaf.

3. The vehicle compartment partition as described in claim 1 wherein said first and second pivot portions include a bore that receives said elongated leg solely.

4. The vehicle compartment partition as described in claim 1 wherein said first end of said torsion rod comprises a leg formed by a bend in the rod.

5. The vehicle compartment partition as described in claim 4 wherein said leg is retained in an opening in said one of said first and second hinge leafs.

6. The vehicle compartment partition as described in claim 5 wherein said opening comprises an aperture in said support portion of said one leaf.

7. The vehicle compartment partition as described in claim 5 wherein said one leaf includes a return bent portion forming said opening as a channel.

8. The vehicle compartment partition as described in claim 7 wherein said return bent portion is rolled.

9. The vehicle compartment partition as described in claim 1 wherein said second end is received in an opening in said support portion.

10. The vehicle compartment partition as described in claim 9 wherein said first end comprises a leg formed by a bend in the rod, and said leg is clamped to said one leaf.

11. A method for assembling a vehicle body panel hinge having first and second hinge sets, each hinge set having a first leaf with a first pivot portion and a second leaf with a second pivot portion comprising:

aligning said first and second pivot portions along a common axis;

inserting a torsion rod into said aligned first and second pivot portions of both said first and second hinge sets;

bending a first end of said torsion rod to a return bent position;

engaging said first end into fixed engagement with one of said leafs of one of said first and second hinge leafs; and return bending the other end of said rod for retaining a second end of said torsion rod with respect to the other leaf of the other of said first and second hinge sets.

12. The method as described in claim 11 and comprising retaining said second end by receiving said second end in a recess in said other leaf.

13. The method as described in claim 11 wherein said bending a first end of said torsion rod precedes said inserting.

14. The method as described in claim 13 wherein said engaging step includes a portion of said inserting step.

15. The method as described in claim 11 wherein said bending step follows said inserting step and said engaging step comprises retracting said first end into an opening in said first leaf.

16. A vehicle hinge for a vehicle panel comprising:

first and second hinge sets, each hinge set including at least one first hinge leaf including a mount portion dimensioned to mate with a panel structure, an extended support portion, and a first pivot portion carried by said extended support portion at a spaced position from said mount portion;

at least one second hinge leaf including a mount portion dimensioned for mating with a vehicle body structure, an extended support portion, and a second pivot portion carried by said extended support portion for alignment with said first pivot portion; and a common torsion rod having an elongated leg extending through aligned first and second pivot portions of each hinge set, said torsion rod having a first end retained against rotation with respect to one of said first and second hinge leafs in a first hinge set, and a second rod end having a return bent portion extending from an aligned longitudinal portion and retained with respect to a support portion of the other of said first and second hinge leafs in a second hinge set.

17. The vehicle hinge as described in claim 1 wherein said second rod end is retained by said other leaf.

* * * * *